United States Patent Office 3,650,979
Patented Mar. 21, 1972

3,650,979
METHYL-POLYSILOXANE-CONTAINING DE-
FOAMING AGENTS AND PREPARATION
THEREOF
Hans-Horst Steinbach, Schildgen, Werner Theuer, Opladen-Luetzenkirchen, and Karl Schnurrbusch, Leverkusen-Steinbuechel, Germany, assignors to Farbenfabriken Bayer Aktiengesellschaft, Leverkusen, Germany
No Drawing. Filed May 16, 1968, Ser. No. 729,546
Claims priority, application Germany, May 26, 1967, F 52,507
Int. Cl. B01d 17/00
U.S. Cl. 252—358                  3 Claims

ABSTRACT OF THE DISCLOSURE

A stable defoaming agent which is very effective in aqueous systems is prepared according to the invention by emulsifying, in 100 to 10,000 parts by weight of water, 100 parts by weight of an $\alpha,\omega$-bis-(trimethylsiloxy)-polydimethyl-siloxane having a viscosity between 500 and 5000 centistokes at 20° C., 1 to 15 parts by weight of finely divided silica and 20 to 40 parts by weight of an emulsifier consisting of a polyglycol ether or a fatty acid ester thereof or of an alkyl- or aryl-sulphate or -sulphonate, and admixing the emulsion so obtained with 100 to 500 parts by weight of a fatty acid ester of hydroxyethane-sulphonic acid or an alkali metal salt thereof.

This invention relates to the production of aqueous dispersions which contain methyl-polysiloxane oils and can be used as foam inhibiting additives for aqueous systems.

Dispersions of this kind have repeatedly been proposed, more recently, for example, in U.S. Pat. specification No. 3,250,727. Ideally these systems should combine good stability, necessary for a long period of storage and transport, with high effectiveness in application. An aqueous dispersion which is prepared in the usual manner from a polydimethyl-siloxane oil, finely divided silica and an emulsifier exhibits a satisfactory defoaming effect when the content of emulsifier is low, but only a short-time stability to the demixing of its phases. If a higher content of emulsifier is used the stability increases, but at the same time the foam inhibiting effect is substantially reduced. In the dispersions described in the patent specification mentioned above the combination of good stability and, at the same time, high effectiveness is achieved by first preparing a very stable dispersion and then improving its inadequate effectiveness by admixing therewith certain polyethers. However, the defoaming agents thus produced have the disadvantage that more than half of their non-aqueous part consists of the expensive methyl-polysiloxane.

We have now produced a dispersion which, compared with this, enables a substantial proportion of methyl-polysiloxane to be saved, and according to the present invention a stable, methylpolysiloxane oil-containing defoaming agent is produced by emulsifying, in 100 to 10,000 parts by weight of water, 100 parts by weight of an $\alpha,\omega$-bis-(trimethylsiloxy)-polydimethyl-siloxane having a viscosity between 500 and 5000 cst. (20° C.), 1 to 15 parts by weight of finely divided silica and 20 to 40 parts by weight of an emulsifier consisting of a polyglycol ether or a fatty acid ester thereof or of an alkyl- or aryl-sulphate or -sulphonate, and admixing the resultant emulsion with 100 to 500 parts by weight of a fatty acid ester of hydroxyethane-sulphonic acid or an alkali metal salt thereof as stabilizer.

The invention thus involves the initial preparation of an emulsion of low stability but good defoaming effect, which is then stabilized by the addition of a protective colloid. Our own experiments have shown that neither starch nor guar, gelatin or polyacrylates are suitable for the last-mentioned purpose; even polyacrylamides have a stabilizing effect only at first, dilution of the dispersions so produced leading to the formation of flakes.

The stabilisers to be used according to the invention are compounds which are known wetting agents and may be prepared, for example, according to U.S. Pat. specification No. 1,881,172. Their fatty acid radical preferably contains more than 7, in commercial products usually 16 to 18, carbon atoms. They impart to the emulsion, which is prepared with a very small amount of emulsifier in proportion to its volume, stability not only at the concentration of preparation but also after further (e.g. tenfold) dilution, which causes no separation of flakes or oil. Nevertheless, the foam preventing effect is excellent, and this was the less to be expected as these ester sulphonates are known to be strong foamers (see, for example, U.S. Pat. specification 1,881,172).

Suitable emulsifiers include nonylphenyl-, oleyl- and stearyl-polyglycol ethers.

The following example is given for the purpose of illustrating the invention.

EXAMPLE 4 g. of a commercial finely divided silica, obtained by flame hydrolysis of $SiCl_4$, are suspended in 100 g. $\alpha,\omega$-bis-(trimethylsiloxy)-polydimethyl-siloxane of viscosity 1500 cst. (20° C.). This suspension is added to a solution of 40 g. of a nonylphenyl polyglycol ether, formed from 10 moles ethylene oxide per mole nonylphenol, in 1850 g. of water, and the mixture is dispersed in a commercial emulsifying machine and then admixed with 100 g. of an ester sulphonate of the formula $C_{17}H_{33}C(O)OC_2H_4SO_3Na$ (according to U.S. Pat. specification No. 1,881,172, Example 1).

When his dispersion is tested for its stability by centrifuging and heating and by dilution with a tenfold amount of water, no enrichment of the phases or separation of oil or flakes will be observed.

The defoaming effect of the dispersion was tested as follows: 1 g. sodium alkyl-sulphonate with 12–18 carbon atoms in the alkyl radical was dissolved in 1 litre of water and, in a test series, amounts of 40 cc. of the resulting strongly foaming wetting agent solution were poured into shaking cylinders of 150 cc. capacity. The dispersion obtained according to the present example was diluted with water to ten times its volume and, in three tests, 0.2, 0.3 and 0.4 cc. respectively of the defoaming agent thus diluted were added to the wetting agent solution in the shaking cylinders. Each mixture was shaken 20 times, then left to rest for 2 minutes, and the remaining foam volume was then measured.

This amounted to 28 cc. with 0.2 cc. of defoaming agent
4 cc. with 0.3 cc. of defoaming agent
1 cc. with 0.4 cc. of defoaming agent In a comparative test, the admixing of the ester sulphonate was omitted and this was replaced with 100 g. of water, the process being otherwise the same. The dispersion so obtained proved to be very unstable; it separated into two layers within a few days and oil rapidly separated from the tenfold dilution. The foam test gave the following results under the conditions described above:

30 cc. of foam after the addition of 0.2 cc. of the dispersion
18 cc. of foam after the addition of 0.3 cc. of the dispersion
5 cc. of foam after the addition of 0.4 cc. of the dispersion In a further comparative test, the admixing of the ester sulphonate was again omitted, but this was replaced with a further 100 g. of the nonylphenyl polyglycol ether so that a total of 140 g. of emulsifier were used. The dispersion become more stable and very readily dilutable, but the foam test carried out in analogy with the preceding test yielded:

34 cc. of foam after the addition of 0.2 cc. of the dispersion
27 cc. of foam after the addition of 0.3 cc. of the dispersion
17 cc. of foam after the addition of 0.4 cc. of the dispersion

What is claimed is:

1. A stable emulsion with a strong defoaming activity in aqueous systems of (1) a preliminary emulsion prepared from a mixture of 100 parts by weight of an $\alpha,\omega$-bis-(trimethylsiloxy)-polydimethylsiloxane having a viscosity of between 500 and 5000 centistokes (20° C.), 1 to 15 parts by weight of finely divided silica, 20 to 40 parts by weight of an emulsifier selected from the group consisting of polyoxyethylated nonylphenol, polyoxyethylated oleyl alcohol and polyoxyethylated stearyl alcohol, and 100 to 10,000 parts by weight of water, with (2) 100 to 500 parts by weight of a fatty acid ester of hydroxyethane-sulfonic acid or an alkali metal salt thereof, the fatty acid radical of said ester having from 7 to 18 carbon atoms.

2. Emulsion according to claim 1 wherein said fatty acid radical contains 16 to 18 carbon atoms.

3. In a process for the manufacture of a stable aqueous antifoam emulsion by emulsifying a mixture of 100 parts by weight of an $\alpha,\omega$-bis-(trimethylsiloxy)-polydimethylsiloxane having a viscosity of between 500 to 5000 centistokes (20° C.), 1 to 15 parts by weight of finely divided silica, 20 to 40 parts by weight of an emulsifier selected from the group consisting of polyoxyethylated nonylphenol, polyoxyethylated oleyl alcohol and polyoxyethylated stearyl alcohol, and 100 to 10,000 parts by weight of water, thereby forming a preliminary emulsion, wherein the improvement comprises the step of admixing with the said preliminary emulsion 100 to 500 parts by weight of a fatty acid ester of hydroxyethane-sulfonic acid or an alkali metal salt thereof, the fatty acid radical of said ester having from 7 to 18 carbon atoms.

References Cited
UNITED STATES PATENTS 3,250,727    5/1966    Noll _____ 252—358

JOHN D. WELSH, Primary Examiner

U.S. Cl. X.R.

252—321